US012624801B2

(12) United States Patent
Kataoka

(10) Patent No.: US 12,624,801 B2
(45) Date of Patent: May 12, 2026

(54) HYDROGEN CARTRIDGE AND GAS SUPPLY SYSTEM

(71) Applicant: TOYOTA JIDOSHA KABUSHIKI KAISHA, Toyota (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/677,126

(22) Filed: May 29, 2024

(65) Prior Publication Data

US 2024/0401746 A1 Dec. 5, 2024

(30) Foreign Application Priority Data

Jun. 2, 2023 (JP) ................................ 2023-091465

(51) Int. Cl.
*F17C 13/04* (2006.01)
*F17C 1/12* (2006.01)

(52) U.S. Cl.
CPC ................ *F17C 13/04* (2013.01); *F17C 1/12* (2013.01); *F17C 2205/0317* (2013.01); *F17C 2221/012* (2013.01)

(58) Field of Classification Search
CPC .... F17C 1/12; F17C 13/04; F17C 2205/0317; F17C 2221/012; F17C 1/04; F17C 13/002; F17C 13/084; F17C 13/123; F17C 2205/0332; F17C 2270/0168; F17C 2205/0111; F17C 2205/0142; F17C 2270/0184; Y02E 60/32; F16K 17/383
USPC ............... 220/562, 581, 582, 592; 251/149.6
See application file for complete search history.

(56) References Cited

U.S. PATENT DOCUMENTS

| | | | | |
|---|---|---|---|---|
| 5,472,024 | A * | 12/1995 | Brugerolle | F17C 7/00 141/351 |
| 6,418,962 | B1 * | 7/2002 | Wozniak | F17C 1/02 220/586 |
| 8,113,709 | B2 * | 2/2012 | Handa | F17C 7/00 141/82 |
| 2003/0066836 | A1 * | 4/2003 | Sakaguchi | F17C 1/14 220/581 |
| 2007/0084654 | A1 | 4/2007 | Kobayashi | |
| 2009/0078706 | A1 * | 3/2009 | Ishitoya | F17C 13/04 220/562 |

(Continued)

FOREIGN PATENT DOCUMENTS

| | | | |
|---|---|---|---|
| JP | 2007099059 | A | 4/2007 |
| JP | 2014186893 | A | 10/2014 |

(Continued)

*Primary Examiner* — Luan K Bui
(74) *Attorney, Agent, or Firm* — Hunton Andrews Kurth LLP

(57) ABSTRACT

Provided is a tank equipped with a container body to store hydrogen gas, a self-closing valve provided in the container body and configured to start and stop discharging the hydrogen gas by opening and closing, a fusible plug provided in the container body and configured to open when a predetermined temperature is reached to release the gas in the tank, and a member that delays heat transfer to the self-closing valve later than to the container body and/or a member that promotes heat transfer to the fusible plug when the hydrogen cartridge is heated.

12 Claims, 10 Drawing Sheets

(56) References Cited

U.S. PATENT DOCUMENTS

| | | | | |
|---|---|---|---|---|
| 2012/0031911 | A1* | 2/2012 | Rose | F15B 1/022 220/581 |
| 2015/0260347 | A1 | 9/2015 | Noguchi | |
| 2023/0134258 | A1* | 5/2023 | Yokoi | F17C 1/00 220/581 |
| 2023/0272885 | A1* | 8/2023 | Hellmann | F17C 13/12 220/586 |
| 2023/0400156 | A1 | 12/2023 | Freudigmann et al. | |
| 2023/0408041 | A1* | 12/2023 | Nakashima | F17C 13/084 |

FOREIGN PATENT DOCUMENTS

| | | | |
|---|---|---|---|
| JP | 2015175416 | A | 10/2015 |
| WO | 2022084005 | A1 | 4/2022 |

* cited by examiner

HYDROGEN CARTRIDGE AND GAS SUPPLY SYSTEM

CROSS-REFERENCE TO RELATED APPLICATION

This application claims priority to Japanese Patent Application No. 2023-091465 filed on Jun. 2, 2023, incorporated herein by reference in its entirety.

BACKGROUND

1. Technical Field

The present disclosure relates to a hydrogen cartridge and a gas supply system into which the hydrogen cartridge is installed and which receives hydrogen.

2. Description of Related Art

Japanese Unexamined Patent Application Publication No. 2007-099059 discloses that a motorcycle equipped with a fuel cell system is equipped with a replaceable hydrogen cylinder, and when the hydrogen cylinder is empty, the hydrogen cylinder is removed and replaced.

SUMMARY

In the relevant art, a structure is often used that allows hydrogen to be released using a fusible plug (safety valve) in the event that a hydrogen cylinder is engulfed in flames due to an accident or malfunction, for example. However, before the fusible plug is removed and the hydrogen is released, a valve for supplying hydrogen may be opened by the heat load of the flames, allowing hydrogen to be released in an unexpected direction.

The present disclosure provides a hydrogen cartridge that can more reliably function as a safety valve when a hydrogen tank is affected by heat due to flames or the like. In addition, a gas supply system equipped with a hydrogen cartridge will be provided.

A first aspect of the disclosure relates to a hydrogen cartridge including a tank. The tank stores hydrogen. The tank includes a container body configured to store hydrogen gas, a self-closing valve provided in the container body and configured to start and stop discharging the hydrogen gas by opening and closing, a fusible plug provided in the container body and configured to open when a predetermined temperature is reached to release gas in the tank, and a member that delays heat transfer to the self-closing valve later than to the container body and/or a member that promotes heat transfer to the fusible plug when the hydrogen cartridge is heated.

In the first aspect, the member that delays heat transfer to the self-closing valve may be a heat insulating material provided around the self-closing valve, and the heat insulating material may not be arranged around the fusible plug.

In the first aspect, the member that delays heat transfer to the self-closing valve may be a heat shielding material arranged with a gap from the self-closing valve, and the heat shielding material may not be arranged around the fusible plug.

In the first aspect, the member that promotes heat transfer to the fusible plug may be a member with higher thermal conductivity than the container body, which is partially arranged on an outer peripheral side of the tank and extends so as to be in contact with the fusible plug.

In the first aspect, the member that promotes heat transfer to the fusible plug may be a combustible resin member that is partially arranged on an outer peripheral side of the tank and extends so as to be in contact with the fusible plug.

The hydrogen cartridge according to the first aspect may further include a case containing the tank. At least one part of the member that delays heat transfer to the self-closing valve may be arranged in the case, and at least one part of the member that promotes heat transfer to the fusible plug may be arranged in the case.

A second aspect of the disclosure relates to a gas supply system including an accommodation portion configured to accommodate a hydrogen tank. The hydrogen tank includes a container body configured to store hydrogen gas, a self-closing valve provided in the container body and configured to start and stop discharging the hydrogen gas by opening and closing, and a fusible plug provided in the container body and configured to open when a predetermined temperature is reached so as to release gas in the tank, and the accommodation portion includes a member that delays heat transfer to the self-closing valve later than to the container body, and/or a member that promotes heat transfer to the fusible plug when a hydrogen cartridge is heated.

In the second aspect, the member that delays heat transfer to the self-closing valve may be a heat insulating material provided in the accommodation portion at a position around the self-closing valve, and the heat insulating material may not be arranged at a position around the fusible plug.

In the second aspect, the member that delays heat transfer to the self-closing valve may be a heat shielding material provided in the accommodation portion at the position around the self-closing valve, and the heat shielding material may not be arranged at the position around the fusible plug.

In the second aspect, the member that promotes heat transfer to the fusible plug may be a member with higher thermal conductivity than the container body, which is partially arranged in the accommodation portion and extends so as to be in contact with the fusible plug.

In the second aspect, the member that promotes heat transfer to the fusible plug may be a combustible resin member that is partially arranged in the accommodation portion and extends so as to be in contact with the fusible plug.

With each aspect of the present disclosure, when a hydrogen tank is affected by heat due to flames or the like, the function of the safety valve (fusible plug) can be more reliably exerted before the on-off valve (self-closing valve) develops a malfunction due to the heat, and thus gas can be discharged from the intended portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Basic Structure of Gas Supply System

Figure 1:
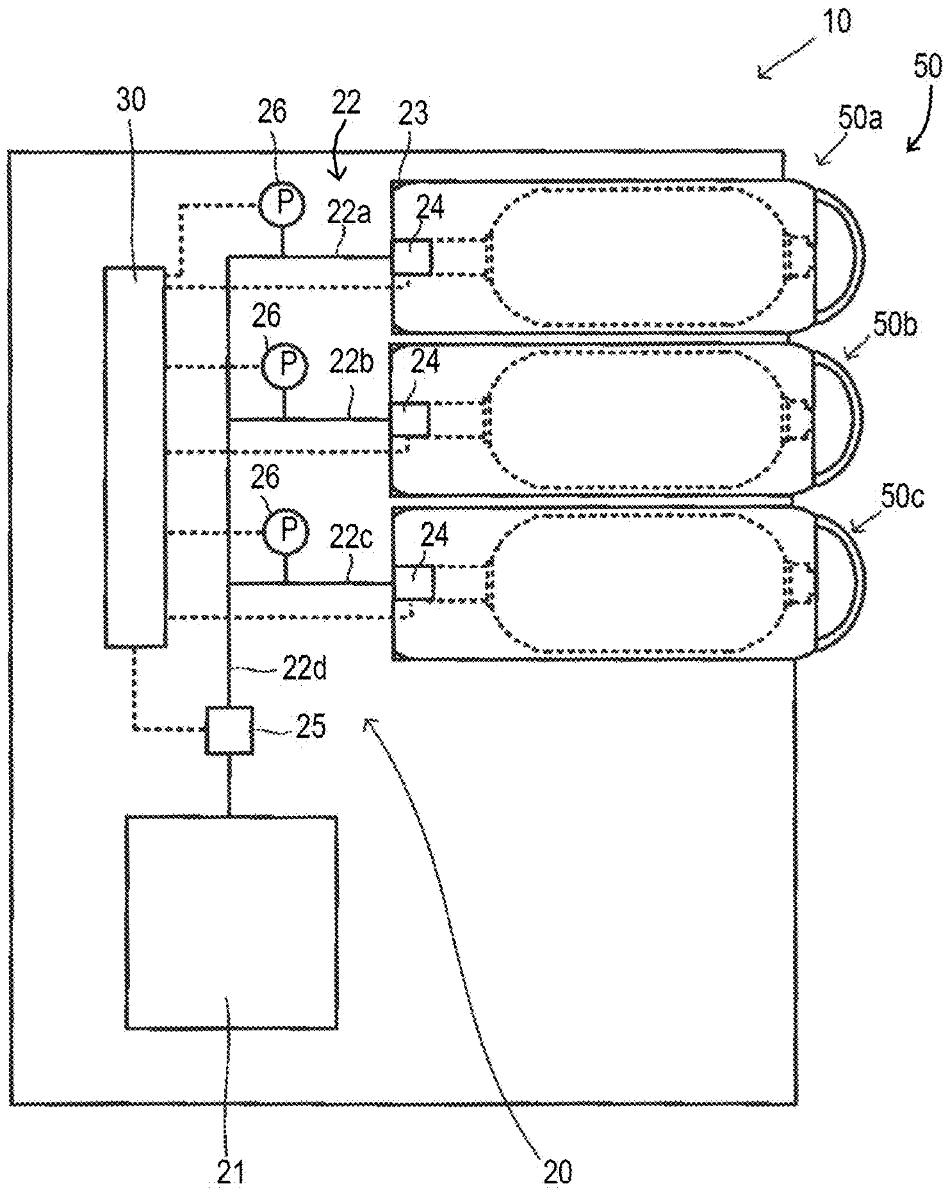
FIG. 1 is a diagram illustrating a configuration of a gas supply system 10.

First, the basic structure of a hydrogen cartridge and a gas supply system into which the hydrogen cartridge is installed will be described. FIG. 1 conceptually illustrates the configuration of a gas supply system 10 according to one embodiment. Such a gas supply system 10 includes a hydrogen cartridge 50 that is a gas supply source, a gas consumption device 20 that is a gas supply destination, and a control device 30. This gas supply system 10 is a system that supplies hydrogen stored in the hydrogen cartridge 50 to a fuel cell 21 included in the gas consumption device 20 to generate electricity. Further, in this form, the hydrogen cartridge 50 is configured to be attachable to and detachable from the gas consumption device 20.

This will be described in detail below.

1.1. Hydrogen Cartridge

Figure 2A:
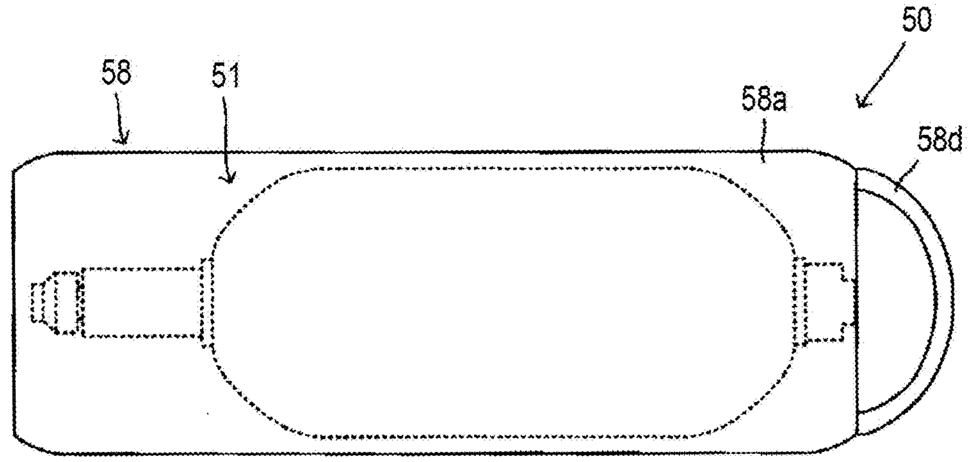
FIG. 2A and FIG. 2B are a diagram illustrating a configuration of a hydrogen cartridge 50.
Figure 2B:
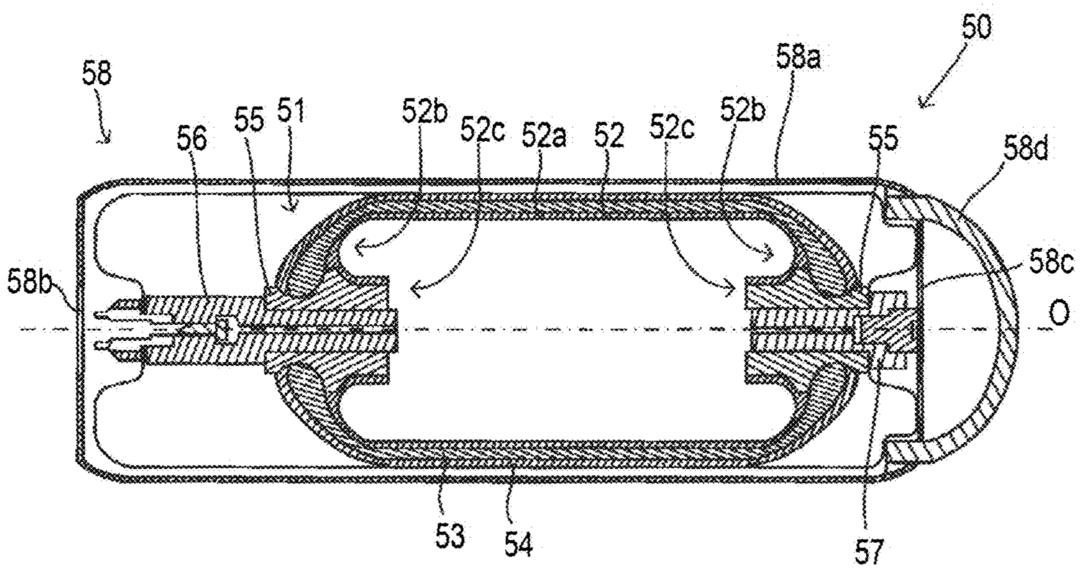

The hydrogen cartridge 50 is a container that stores the gas (hydrogen in this form) to be supplied in a liquid state or a gaseous state. FIG. 2A and FIG. 2B illustrate a diagram for description of the hydrogen cartridge. FIG. 2A is an external view (a tank 51 contained therein is illustrated with a dotted line) of the hydrogen cartridge 50, and FIG. 2B is a cross-sectional view of the hydrogen cartridge 50 along an axial direction O. As can be seen from these figures, the hydrogen cartridge 50 in this form includes the tank 51 and a case 58.

The tank 51 also includes a liner 52, a reinforcing layer 53, and a protective layer 54, which constitute a container body, and further includes a cap 55, a self-closing valve 56, and a fusible plug 57.

1.1.1. Liner

The liner 52 is a hollow member that partitions the internal space of the container body of the tank 51, and has a cylindrical shape in this form. The liner 52 has openings at both ends of a body portion 52*a* having a generally constant diameter which are narrowed by side end portions 52*b* having dome shapes, and a cap 55 is arranged in a narrow opening 52*c*.

As long as the liner 52 is made of a material that can hold what (for example, hydrogen) is accommodated in its internal space without leaking, any known material can be used. Specifically, the liner is made of, for example, nylon resin, polyethylene-based synthetic resin, or metal such as stainless steel or aluminum. Among these, from the viewpoint of reducing the weight of the tank, it is preferable that the liner be made of synthetic resin.

The thickness of the liner 52 is not particularly limited, but is preferably 0.5 mm to 3.0 mm.

1.1.2. Reinforcing Layer

The reinforcing layer 53 is one of the members constituting the container body, and is made up of a plurality of layers of fibers, and the fibers are impregnated with a hardened resin. The fiber layer is formed by wrapping a fiber bundle around the outer periphery of the liner 52 to a predetermined thickness in a plurality of layers. The thickness of the reinforcing layer 53 and the number of turns of the fiber bundle are determined depending on the required strength and are not particularly limited, but are approximately 10 mm to 30 mm.

Fiber Bundle

For example, carbon fibers are used for the fiber bundle of the reinforcing layer 53, and the fiber bundle is a band-shaped bundle of carbon fibers having a predetermined cross-sectional shape (for example, a rectangular cross-section). Although there is no specific limitation, the cross-sectional shape may be rectangular with a width of about 6 mm to 20 mm and a thickness of about 0.1 mm to 0.3 mm. Although the amount of carbon fibers contained in the fiber bundle is not particularly limited, it may be composed of about 36,000 carbon fibers, for example.

Impregnated Resin

The resin impregnated and cured into the fibers (fiber bundle) in the reinforcing layer 53 is not particularly limited as long as it can increase the strength of the fibers. Examples of the resin include thermosetting resins that harden with heat; specifically, epoxy resins containing amine-based or anhydride-based curing accelerators, and rubber-based reinforcing agents, unsaturated polyester resins, and the like. Other examples include resin compositions that use an epoxy resin as a main ingredient and are cured by mixing a curing agent thereinto. According to this, the resin composition, which is the mixture, automatically cures by reaching and permeating the fiber layer between the time when the base resin and the curing agent are mixed and before they are cured.

1.1.3. Protective Layer

If necessary, the protective layer 54 may be arranged around the outer periphery of the reinforcing layer 53 as one of the members constituting the container body. When installed, for example, glass fiber is wound and resin is impregnated therein. The impregnated resin can be regarded as identical to that of the reinforcing layer 53. This makes it possible to impart impact resistance to the tank 51.

The thickness of the protective layer 54 is not particularly limited, but may be approximately 1.0 mm to 1.5 mm.

1.1.4. Cap, Self-Closing Valve, Fusible Plug

The cap 55 is a member attached to each of the two openings 52*c* of the liner 52. The caps 55 are arranged at both ends of the liner 52 in the axial direction O, and function as openings that allow communication between the inside and outside of the container body, and are provided with valves. The self-closing valve 56 is arranged in a first cap 55, and the fusible plug 57 is arranged in a second cap 55.

The material constituting the cap 55 is not particularly limited as long as it has the necessary strength, and examples include stainless steel, aluminum, copper, and iron.

The self-closing valve 56 is a so-called check valve or on-off valve. The self-closing valve 56 is closed when the hydrogen cartridge 50 is not attached to the gas supply system 10, and is opened by being pressed by a push rod 24*a* when the hydrogen cartridge 50 is attached to the gas consumption device 20 of the gas supply system 10, as will be described below.

Although any known self-closing valve 56 can be used, for example, a wholly aromatic polyimide resin (for example, Vespel (registered trademark), DuPont) is used as the sealing material.

The fusible plug 57 is also called a fusible alloy safety valve and is a safety valve that opens when a predetermined temperature is reached to release the gas (hydrogen) in the tank. The specific aspect of the fusible plug 57 is not particularly limited, and known fusible plugs can be used.

1.1.5. Case

The case 58 is a member enclosing the tank 51 and forming the outer shell of the hydrogen cartridge 50, and has a housing 58*a* and a handle 58*d*.

The housing 58*a* is a cylindrical member, and is configured such that the tank 51 can be accommodated inside the housing 58*a*. Further, in the housing 58*a*, holes 58*b* and 58*c* are provided at positions facing the self-closing valve 56 and fusible plug 57 of the tank 51 accommodated in the housing 58*a*, respectively, the self-closing valve 56 is accessed from the outside, and hydrogen injected from the fusible plug 57 can be discharged to the outside.

The handle 58*d* is an arch-shaped member arranged at the end of the housing 58*a* on the fusible plug 57 side. The user can carry the hydrogen cartridge 50 and attach/detach the hydrogen cartridge 50 to/from the gas supply system 10 by holding the handle 58*d*.

1.1.6. Others

The allowable pressure of the tank 51 is not particularly limited, but from the viewpoint of being able to supply more hydrogen, a tank that can store hydrogen at an allowable pressure of more than 20 MPa and less than 70 MPa can be included.

In this form, as described above, the self-closing valve 56 and the fusible plug 57 are arranged in different caps 55, and are provided so that a first end of the tank 51 and a second end thereof are opposite sides each other. The present disclosure is not necessarily limited to this form, and both valves may be arranged in the same cap. However, as described below, a more remarkable effect can be achieved in a configuration like this form in which the self-closing valve 56 and the fusible plug 57 are arranged in different caps 55, and are provided on opposite sides, that is, at the first end and the second end of the tank 51.

In the gas supply system 10 of this form, a plurality of (for example, three) hydrogen cartridges 50 are provided, and each tank 51 is filled with hydrogen. Here, an example is given in which three hydrogen cartridges 50 are arranged, and in order to distinguish them, they are represented by numerals and letters 50*a*, 50*b*, 50*c*. The tanks 51 of these hydrogen cartridges 50 may all have the same capacity, or may include tanks with different capacities.

1.2. Gas Consumption Device

The gas consumption device 20 is a gas supply destination of the hydrogen cartridge 50, and is a device that receives and consumes gas. As illustrated in FIG. 1, the gas consumption device 20 in this form includes the fuel cell 21, a supply channel 22, an accommodation portion 23, a connection device 24, an injection port 25, and a pressure gauge 26.

Examples of gas consumption devices include devices that achieve their goals by generating electricity using hydrogen as one of the fuels. Although not particularly limited, examples include power generation and/or power storage devices using fuel cells, automobiles that obtain power from fuel cells, and the like.

1.2.1. Fuel Cell

The fuel cell 21 is a device that consumes the supplied gas, and receives hydrogen from the hydrogen cartridge 50 while receiving air from an air hole (not illustrated) to generate electricity. The specific configuration of the fuel cell 21 is not particularly limited, and any known configuration can be used.

1.2.2. Supply Channel

The supply channel 22 is a path that guides gas from the hydrogen cartridge 50 to the fuel cell 21, and is composed of piping. In this form, each of the hydrogen cartridges 50*a*, 50*b*, 50*c* is connected to the fuel cell 21. Here, pipes 22*a*, 22*b*, 22*c* respectively extending from the hydrogen cartridges 50*a*, 50*b*, 50*c* are joined together to form one pipe 22*d*, which is connected to the fuel cell 21.

1.2.3. Accommodation Portion

Figure 3:
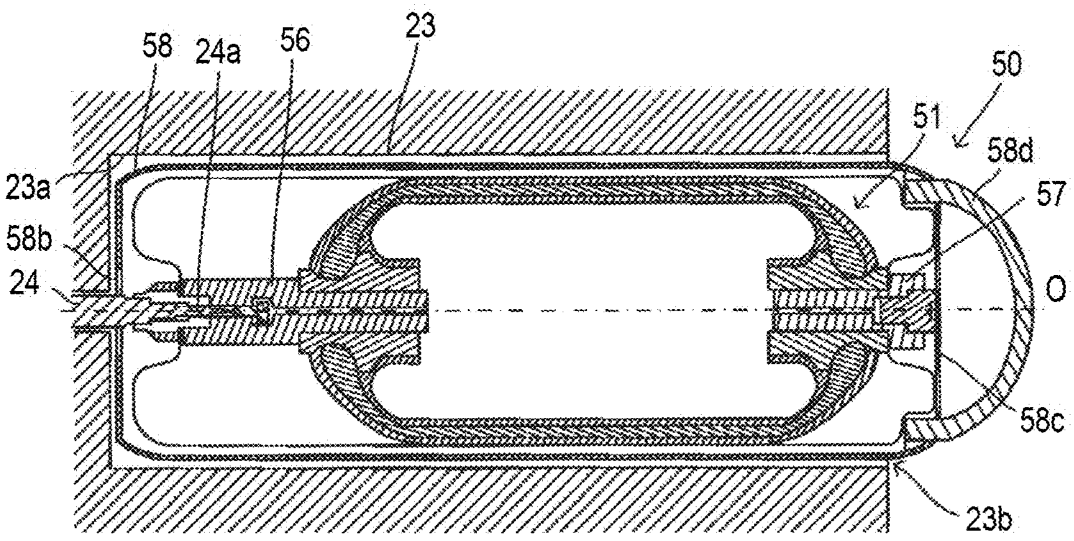
FIG. 3 is a diagram illustrating a situation in which the hydrogen cartridge 50 is accommodated in an accommodation portion 23.

The accommodation portion 23 is a portion where the hydrogen cartridge 50 is accommodated when the hydrogen cartridge 50 is connected to the gas consumption device 20. FIG. 3 illustrates a situation in which the hydrogen cartridge 50 is connected to the gas consumption device 20 from the same viewpoint as FIG. 2B. As can be seen from FIG. 3, the accommodation portion 23 is a space in which the hydrogen cartridge 50 is arranged, and is a space surrounded by an inner surface 23*a* having an opening 23*b* through which the hydrogen cartridge 50 can be taken in and taken out. The connection device 24 is arranged on a wall portion of the accommodation portion 23 that is opposite the opening.

1.2.4. Connection Device

The connection device 24 is arranged at a connection part between the tank 51 of the hydrogen cartridge 50 and the supply channel 22, is connected to the self-closing valve 56 of the tank 51, and opens and closes the self-closing valve 56 of the tank 51. As can be seen from FIG. 3, the connection device 24 has the push rod 24*a* having a rod shape and arranged in the accommodation portion 23. When the hydrogen cartridge 50 is accommodated in the accommodation portion 23, the push rod 24*a* presses the valve body of the self-closing valve 56, thereby opening the self-closing valve 56 and connecting it to the supply channel 22.

1.2.5. Injection Port

The injection port 25 is arranged in the supply channel 22 (the supply channel 22*d* in this form) between the connection device 24 and the fuel cell 21, and controls the supply of hydrogen to the fuel cell 21. Although the specific form of the injection port is not particularly limited, a flow rate regulating valve can be included.

1.2.6. Pressure Gauge

The pressure gauge 26 is a pressure gauge that measures the pressure (pressure in the pipe) in the flow path of the supply channel 22 between the connection device 24 and the injection port 25. Although the specific form of the pressure gauge 26 is not particularly limited, it is configured so that the obtained pressure value data can be transmitted to the control device 30.

1.3. Control Device

The control device 30 is a device that controls each device of the gas supply system 10 and maintains proper operation thereof, and is configured to be able to communicate with the push rod 24*a* of the connection device 24, the injection port 25, the pressure gauge 26, and the like.

The control device 30 includes a central processing unit (CPU), which is a processor and performs calculations, a random access memory (RAM) that functions as a workspace, a read-only memory (ROM), which functions as a storage media, a receiving unit that is an interface for accepting information into the control device 30 regardless of whether the information is in wired or wireless format, and a transmitting unit, which is an interface for transmitting information from the control device 30 to the outside, regardless of whether the information is in wired or wireless format. The control device 30 obtains information from each device, performs calculations necessary to operate the gas supply system 10, and transmits control signals to the necessary devices.

Such a control device 30 can typically be configured by a computer.

2. Aspects of Hydrogen Cartridge According to Present Disclosure

It is necessary to assume that the hydrogen cartridge will be exposed to flames for whatever reason, both when it is attached to the hydrogen supply system and when it is not attached. For this reason, a safety measure is taken in which a fusible plug is arranged to exhaust the gas from the tank when the specified temperature is reached. In this case, depending on the position and orientation of the heat source such as flames with respect to the tank, the on-off valve may be heated before the fusible plug, causing a problem on the on-off valve side and causing gas to be discharged in an unexpected direction. This tendency is particularly strong when the self-closing valve 56 (on-off valve) and the fusible plug 57 are arranged at separate positions on opposite sides of the tank 51, as in the hydrogen cartridge 50 described above. When the on-off valve and the fusible plug are arranged on the same side of the tank, the valves will overlap on the side where the valve is arranged, so the size of the tank will tend to increase. Thus, by separately arranging the valves to a first side and a second side of the tank as in this form, there is an advantage that the hydrogen cartridge can be made smaller.

Therefore, the hydrogen cartridge 50 described above has the following form.

2.1. Self-Closing Valve Side Aspect

The first aspect is configured such that it is more difficult for heat to be transmitted to the self-closing valve 56 side than to the container body (delaying heat transfer) and/or it is difficult for heat to be directly transmitted to the self-closing valve 56 (delaying heat transfer). As a result, heat is transferred to the fusible plug 57 before the self-closing valve 56 malfunctions, and the fusible plug 57 operates to obtain the intended gas discharge. Specific examples of the form will be described below.

2.1.1. Form 1A

Figure 4A:
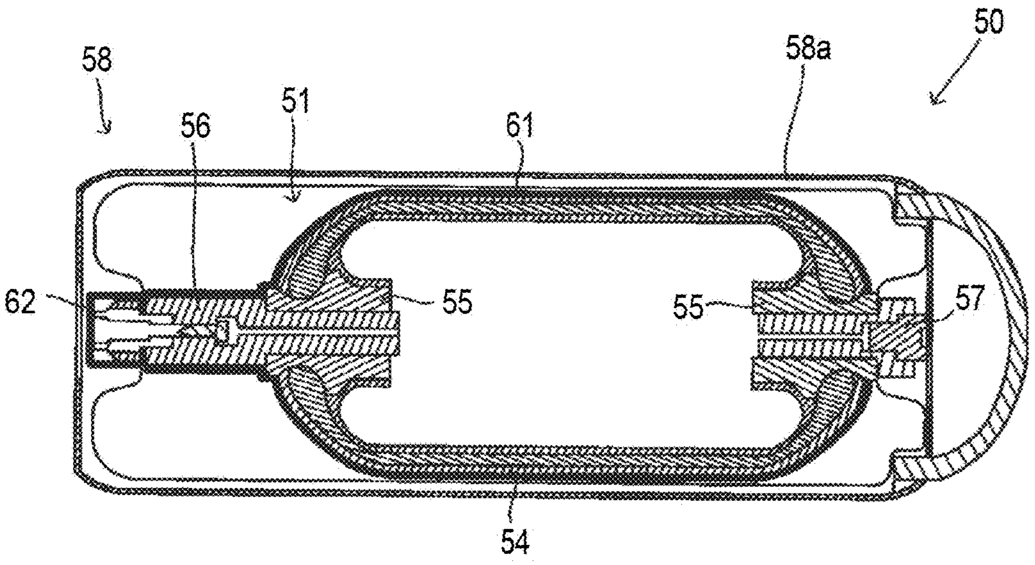
FIG. 4A is a diagram illustrating a form 1A.

FIG. 4A illustrates the hydrogen cartridge 50 according to a form 1A. FIG. 4A is a view from the same perspective as FIG. 2B. In the form 1A, the outer periphery of the protective layer 54 of the tank 51 and the outer periphery and end surface of the self-closing valve 56 are covered with heat insulating materials 61, 62, but the outer periphery of the fusible plug 57 is not covered. In this form, the outer periphery of the protective layer 54 and the outer periphery of the self-closing valve 56 are covered with the heat insulating material 61, and the end surface of the self-closing valve 56 is covered with the heat insulating material 62 having a cap shape.

By arranging such a heat insulating material, which is a member that delays the heat transfer to the self-closing valve later than the container body, when the hydrogen cartridge 50 is affected by heat due to flames or the like, the fusible plug 57 can function first to perform the intended gas discharge while suppressing the heat effect on the self-closing valve 56.

The type of insulation material is not particularly limited, and known materials can be used. Typically, a material having a thermal conductivity of 0.2 W/(m·K) or less, preferably 0.1 W/(m·K) or less can be used. Specific examples include nitrile rubber with a closed cell structure.

2.1.2. Form 1B

Figure 4B:
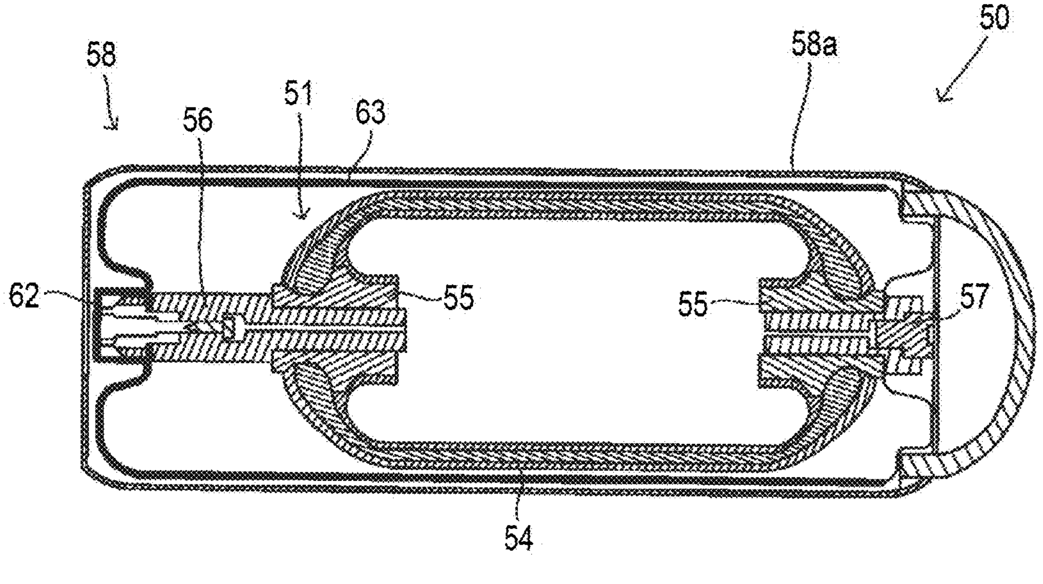
FIG. 4B is a diagram illustrating a form 1B.

FIG. 4B illustrates the hydrogen cartridge 50 according to a form 1B. FIG. 4B is a view from the same perspective as FIG. 2B. In the form 1B, the inner surface of the housing 58*a* of the case 58 and the end surface of the self-closing valve 56 are covered with heat insulating materials 63, 62, but the outer periphery of the fusible plug 57 is not covered. In this form, the inner surface of the housing 58*a* of the case 58 is covered with the heat insulating material 63, and the end surface of the self-closing valve 56 is covered with the heat insulating material 62 having a cap shape.

By arranging such a heat insulating material, which is a member that delays the heat transfer to the self-closing valve later than the container body, when the hydrogen cartridge 50 is affected by heat due to flames or the like, while the thermal effects on the self-closing valve 56 are suppressed by the heat insulating materials 63, 62, the fusible plug 57 can function first to perform the intended gas discharge.

The type of heat insulating material can be regarded as identical to that in the form 1A.

2.1.3. Form 1C

Figure 5A:
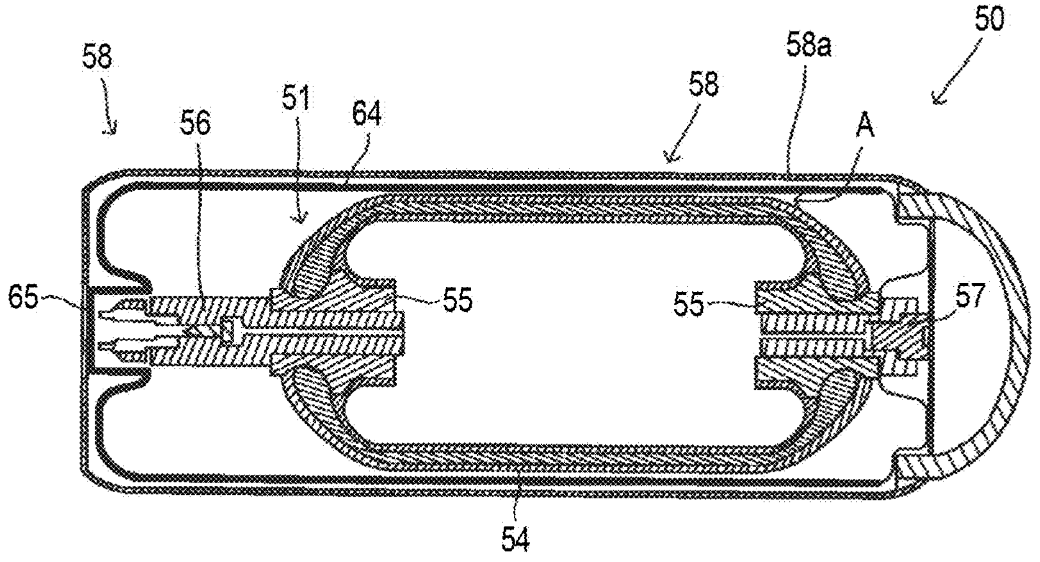
FIG. 5A is a diagram illustrating a form 1C.

FIG. 5A illustrates the hydrogen cartridge 50 according to a form 1C. FIG. 5A is a view from the same perspective as FIG. 2B. In the form 1C, the inner surface of the housing 58*a* of the case 58 and the end surface of the self-closing valve 56 are covered with heat shielding materials 64, 65 made of a material with lower thermal conductivity than the container body, but the outer periphery of the fusible plug 57 is not covered. In this form, the inner surface of the housing 58*a* of the case 58 is covered with the heat shielding material 64, and the end surface of the self-closing valve 56 is covered with the heat shielding material 65 having a cap shape. Also, the heat shielding material 64 and the protective layer 54 of the tank 51, and the heat shielding material 65 and the self-closing valve 56 have a gap A without contacting each other, and are configured to form an air layer therebetween.

By arranging such a heat shielding material, which is a member that delays the heat transfer to the self-closing valve later than the container body, when the hydrogen cartridge 50 is affected by heat due to flames or the like, the heat shielding materials 64, 65 diffuse and release heat to the outside, and while suppressing the thermal influence on the self-closing valve 56, the fusible plug 57 can function first to perform the intended gas discharge. The type of heat shielding material is not particularly limited, and known materials can be used.

2.1.4. Form 1D

Figure 5B:
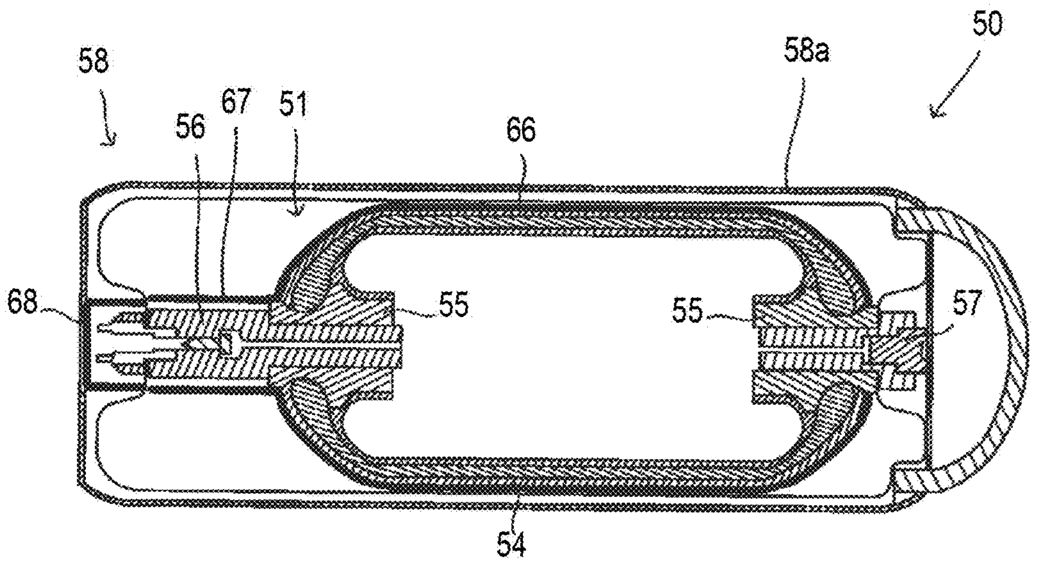
FIG. 5B is a diagram illustrating a form 1D.

FIG. 5B illustrates the hydrogen cartridge 50 according to a form 1D. FIG. 5B is a view from the same perspective as FIG. 2B. In the form 1D, the outer periphery of the protective layer 54 of the tank 51 is covered with a heat insulating material 66, the outer periphery and end surface of the self-closing valve 56 are covered with heat shielding materials 67, 68, and the outer periphery of the fusible plug 57 is not covered. The heat shielding materials 67, 68 and the self-closing valve 56 do not contact each other but have a gap therebetween, and are configured such that an air layer is formed there.

By arranging such heat insulating material and heat shielding materials, which are members that delay the heat transfer to the self-closing valve later than the container body, when the hydrogen cartridge 50 is affected by heat due to flames or the like, the heat insulating material 66 suppresses the transfer of heat to the container body and the heat shielding materials 67, 68 diffuse heat and release it to the outside, so the fusible plug 57 can function first and perform the intended gas discharge while suppressing the thermal influence on the self-closing valve 56.

The type of heat insulating material can be regarded as identical to that in the form 1A, and the type of heat shielding material can be considered as in the form 1C.

2.2. Fusible Plug Side Aspect

In a second aspect, the structure is such that heat is more easily transmitted to the fusible plug 57 side than to the container body. As a result, heat is transferred to the fusible plug 57 before a malfunction occurs in the self-closing valve 56, and the fusible plug 57 operates to perform the intended gas discharge. A specific form will be described below.

2.2.1. Form 2A

Figure 6A:
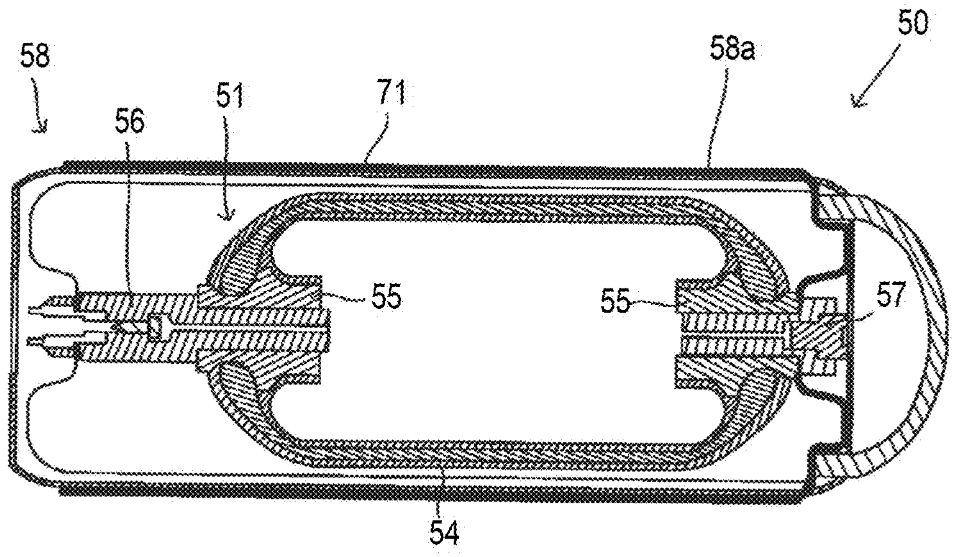
FIG. 6A is a diagram illustrating a form 2A.

FIG. 6A illustrates the hydrogen cartridge 50 according to a form 2A. FIG. 6A is a view from the same perspective as FIG. 2B. In the form 2A, a heat conductive material 71 is arranged. The heat conductive material 71 is a material with higher thermal conductivity than the container body, and in this form, the heat conductive material 71 covers the outer periphery of the housing 58*a* of the case 58, and extends continuously therefrom so as to be in contact with the fusible plug 57. In this form, the self-closing valve 56 is not covered with a heat insulating material or a heat shielding material, and is not in contact with the heat conductive material.

By arranging such a heat conductive material, which is a member that promotes heat transfer to the fusible plug more than the container body, when the hydrogen cartridge 50 is affected by heat due to flames or the like, heat is quickly transferred to the fusible plug 57 via the heat conductive material 71, so the fusible plug 57 functions by being heated before the self-closing valve 56, allowing the intended gas to be discharged.

The type of heat conductive material is not particularly limited, and known materials can be used. Typically, a material having a thermal conductivity of 50 W/(m·K) or more, preferably 200 W/(m·K) or more can be used. Specific examples include metals, such as iron and aluminum.

2.2.2. Form 2B

Figure 6B:
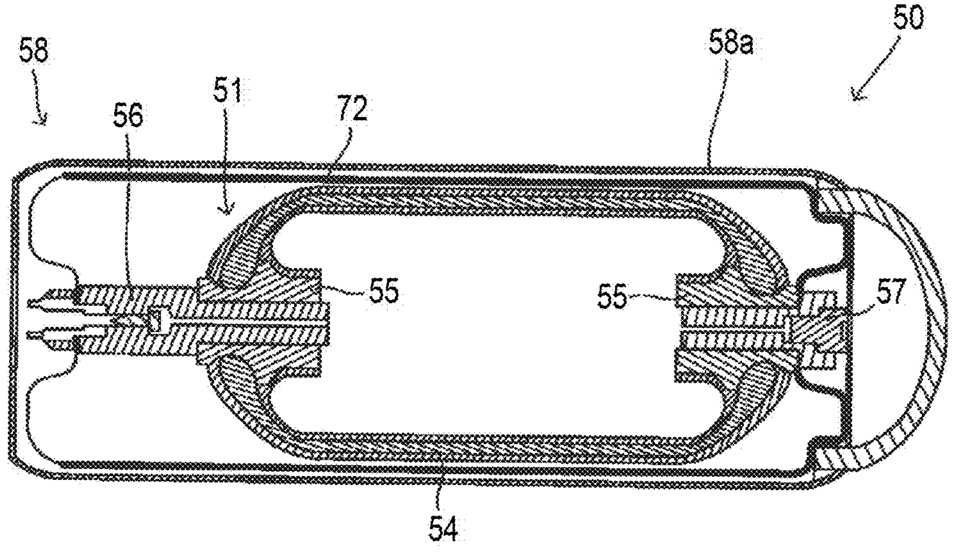
FIG. 6B is a diagram illustrating a form 2B.

FIG. 6B illustrates the hydrogen cartridge 50 according to a form 2B. FIG. 6B is a view from the same perspective as FIG. 2B. In the form 2B, a heat conductive material 72 is arranged. The heat conductive material 72 is a material with higher thermal conductivity than the container body, and in this form, the heat conductive material 72 covers the inner surface of the housing 58*a* of the case 58 and extends continuously therefrom so as to be in contact with the fusible plug 57. In this form, the self-closing valve 56 is not covered with any heat insulating material or heat shielding material, and is not in contact with any heat conductive material. In this case, it is preferable for there to be a gap between the heat conductive material 72 and the protective layer 54 of the tank 51, and for an air layer be formed there.

By arranging such a heat conductive material that promotes heat transfer to the fusible plug more than the container body, when the hydrogen cartridge 50 is affected by heat due to flames or the like, the heat is quickly transferred to the fusible plug 57 via the heat conductive material 72, so the fusible plug 57 functions by being heated before the self-closing valve 56, allowing the intended gas to be discharged.

The type of heat conductive material can be regarded as identical to that in the form 2A 2.2.3. Form 2C In a form 2C, a portion of the housing 58*a* of the case 58 that forms the cylindrical side surface and a portion that forms the end portion on the fusible plug 57 side are formed of combustible resin (not illustrated). A portion of the housing 58*a* that forms the end on the self-closing valve 56 side is made of a non-combustible material.

By arranging such combustible resin, which is a member that promotes heat transfer to the fusible plug more than the container body, when the hydrogen cartridge 50 is affected by heat due to flames or the like, the portion of the housing 58*a* formed of combustible resin burns and acts as a guide, such that heat is quickly transferred to the fusible plug 57, so the fusible plug 57 functions by being heated before the self-closing valve 56, allowing the intended gas to be discharged.

The type of such combustible resin is not particularly limited, and examples thereof include polyethylene (PE) and polypropylene (PP).

2.2.4. Form 2D

Figure 7:
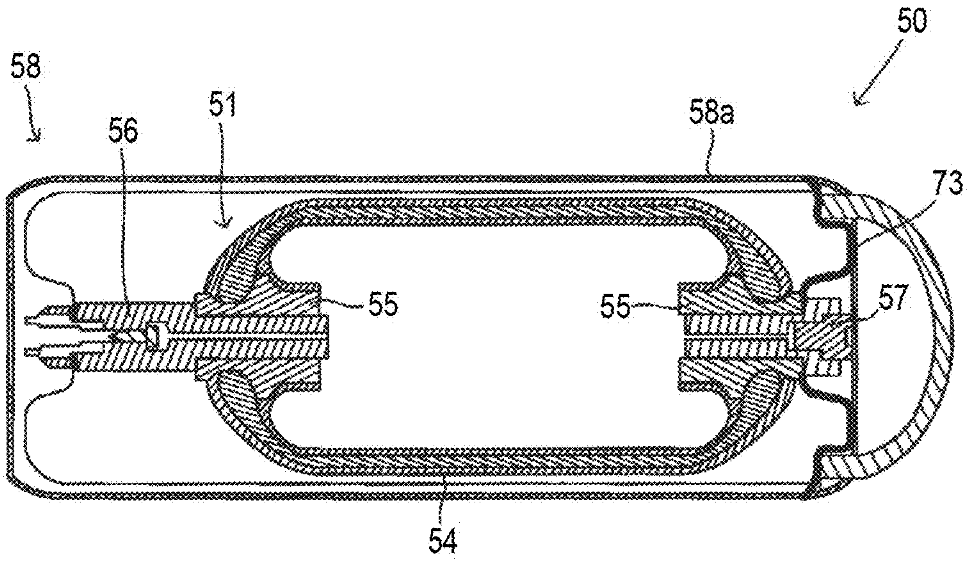
FIG. 7 is a diagram illustrating a form 2D.

FIG. 7 illustrates the hydrogen cartridge 50 according to a form 2D. FIG. 7 is a view from the same perspective as FIG. 2B. In the form 2D, a portion of the housing 58*a* of the case 58 that forms the cylindrical side surface is made of combustible resin, and a heat conductive material 73 extends continuously therefrom so as to be in contact with the fusible plug 57.

By arranging such a heat conductive material and combustible resin, which are members that promote heat transfer to the fusible plug more than the container body, when the hydrogen cartridge 50 is affected by heat due to flames or the like, the portion of the housing 58*a* formed of combustible resin burns and acts as a guide, such that heat is transmitted to the heat conductive material 73, and this heat is further transmitted through the heat conductive material 73 and reaches the fusible plug 57. Therefore, the fusible plug 57 functions by being heated before the self-closing valve 56, allowing the intended gas to be discharged.

The combustible resin can be regarded as identical to that in the form 2C, and the type of heat conductive material can be regarded as identical to that in the form 2A.

2.3. Others

The forms 1A to 1D and forms 2A to 2D may be used in combination. That is, a configuration in which makes it more difficult for heat to be transmitted to the self-closing valve 56 than the container body and a configuration in which makes it easier for heat to be transmitted to the fusible plug 57 than the container body may be applied together. More specifically, the form 1A and any of the forms 2A to 2D, the form 1B and any of the forms 2A to 2D, the form 1C and any of the forms 2A to 2D, and the form 1D and any of the forms 2A to 2D can be combined.

3. Aspect of Accommodation Portion of Gas Consumption Device According to Present Disclosure In the description, the aspect in which the intended gas discharge is performed using the fusible plug 57 in the hydrogen cartridge 50 has been described, but instead of this or in conjunction with this, an aspect can be applied to the accommodation portion 23 of the gas consumption device 20 in which intended gas discharge is performed using the fusible plug 57.

3.1. Self-Closing Valve Side Aspect

A third aspect is configured such that heat is less likely to be transmitted to the self-closing valve 56 than to the container body (delaying heat transfer) and/or it is difficult for heat to be directly transmitted to the self-closing valve 56 (delaying heat transfer). As a result, the fusible plug 57 is operated to perform the intended gas discharge before the self-closing valve 56 malfunctions. A specific form will be described below.

3.1.1. Form 3A

Figure 8A:
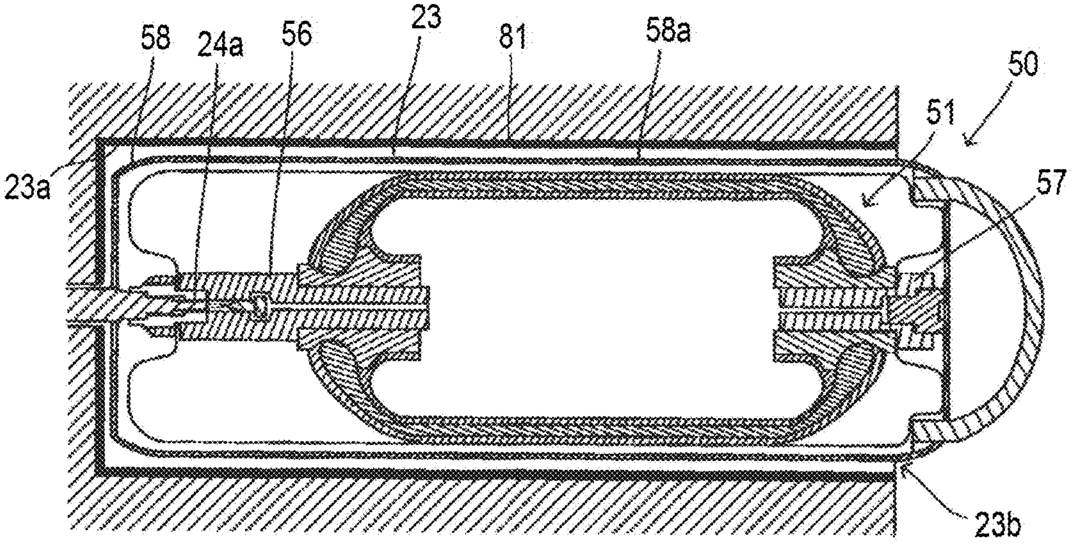
FIG. 8A is a diagram illustrating a form 3A.

FIG. 8A illustrates a diagram illustrating an aspect of a form 3A. FIG. 8A is a view from the same perspective as FIG. 3, with the hydrogen cartridge 50 attached to the accommodation portion 23.

In the form 3A, a portion of the inner surface 23*a* of the accommodation portion 23 facing the side surface of the housing 58*a* of the hydrogen cartridge 50 and a portion facing the end surface of the housing 58*a* on the self-closing valve 56 side are covered with a heat insulating material 81, and the end surface of the housing 58*a* on the side where the fusible plug 57 is arranged is not covered.

By arranging such a heat insulating material, which is a member that delays the heat transfer to the self-closing valve later than the container body, when the hydrogen cartridge 50 is affected by heat due to flames or the like, the fusible plug 57 can function first to perform the intended gas discharge while suppressing the heat effect on the self-closing valve 56.

The type of heat insulating material can be regarded as identical to that in the form 1A.

3.1.2. Form 3B

Figure 8B:
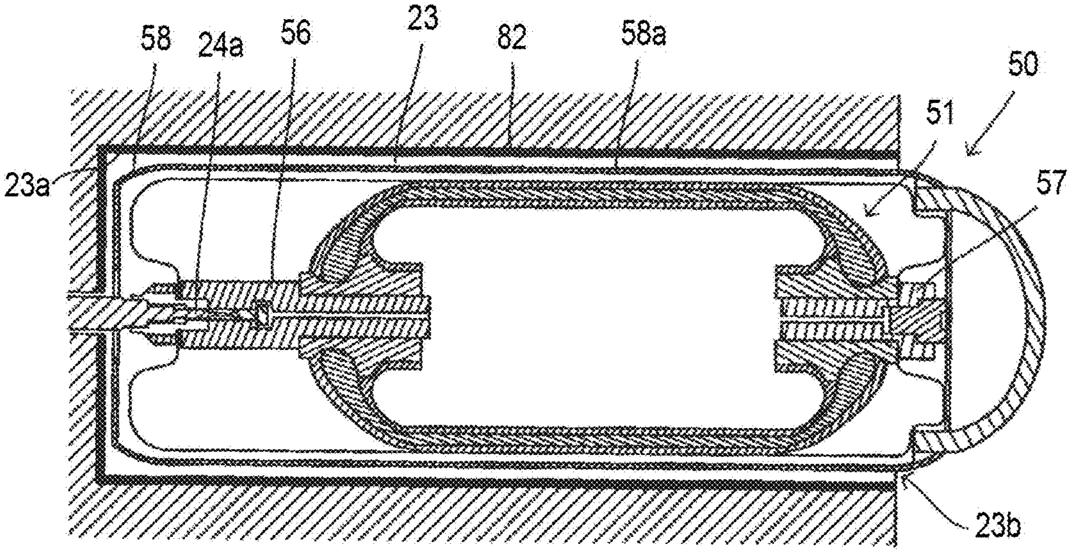
FIG. 8B is a diagram illustrating a form 3B.

FIG. 8B illustrates a diagram illustrating an aspect of a form 3B. FIG. 8B is a view from the same perspective as FIG. 3, with the hydrogen cartridge 50 attached to the accommodation portion 23.

In the form 3B, a portion of the inner surface 23*a* of the accommodation portion 23 facing the side surface of the housing 58*a* of the hydrogen cartridge 50 and a portion facing the end surface of the housing 58*a* on the self-closing valve 56 side are covered with a heat shielding material 82, and the end surface of the housing 58*a* on the side where the fusible plug 57 is arranged is not covered. The heat shielding material 82 and the housing 58*a* do not come into contact with each other, but have a gap therebetween, and are configured to form an air layer there.

By arranging such a heat shielding material, which is a member that delays the heat transfer to the self-closing valve later than the container body, when the hydrogen cartridge 50 is affected by heat due to flames or the like, the heat shielding material 82 diffuses heat and releases the heat to the outside, and while suppressing the thermal influence on the self-closing valve 56, the fusible plug 57 can function first to perform the intended gas discharge.

The type of heat shielding material can be regarded as identical to that in the form 1C.

3.2. Fusible Plug Side Aspect

In the fourth aspect, the structure is such that heat is more easily transmitted to the fusible plug 57 side than to the container body. As a result, the fusible plug 57 is operated to perform the intended gas discharge before the self-closing valve 56 malfunctions. A specific form will be described below.

3.2.1. Form 4A

Figure 9A:
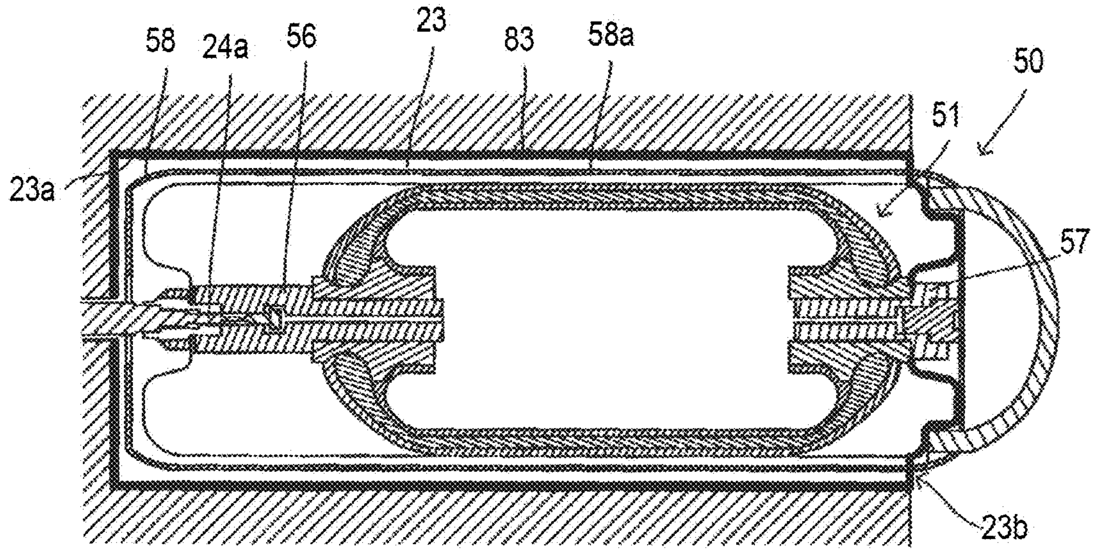
FIG. 9A is a diagram illustrating a form 4A.

FIG. 9A illustrates a diagram illustrating an aspect of a form 4A. FIG. 9A is a view from the same perspective as FIG. 3, with the hydrogen cartridge 50 attached to the accommodation portion 23.

In the form 4A, a heat conductive material 83 is arranged. The heat conductive material 83 is a material with higher thermal conductivity than the container body. In this form, the heat conductive material 83 covers a portion of the inner surface 23*a* of the accommodation portion 23 that faces the side surface of the housing 58*a* of the hydrogen cartridge 50 and a portion that faces the end surface of the housing 58*a* on the self-closing valve 56 side. Also, the heat conductive material 83 extends continuously therefrom so as to be in contact with the fusible plug 57. In this case, it is preferable for an air layer to be formed with a gap between the heat conductive material 83 and the housing 58*a*.

By arranging such a heat conductive material that promotes heat transfer to the fusible plug more than the container body, when the hydrogen cartridge 50 is affected by heat due to flames or the like, the heat is transmitted to the fusible plug 57 via the heat conductive material 83, so that the fusible plug 57 functions by being heated before the self-closing valve 56, allowing the intended gas to be discharged.

The type of heat conductive material can be regarded as identical to that in the form 2A.

3.2.2. Form 4B

Figure 9B:
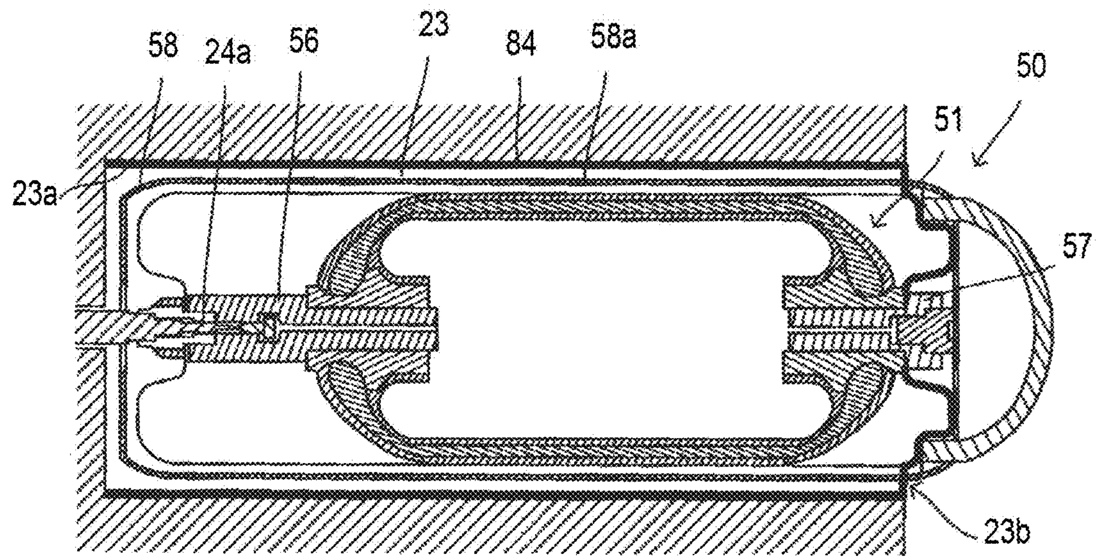
FIG. 9B is a diagram illustrating a form 4B.

FIG. 9B illustrates a diagram illustrating an aspect of a form 4B. FIG. 9B is a view from the same perspective as FIG. 3, with the hydrogen cartridge 50 attached to the accommodation portion 23.

In the form 4B, combustible resin 84 is arranged. In this form, the combustible resin 84 covers a portion of the inner surface 23*a* of the accommodation portion 23 that faces the side surface of the housing 58*a* of the hydrogen cartridge 50, and the combustible resin 84 extends continuously therefrom so as to be in contact with the fusible plug 57.

By arranging such combustible resin, which is a member that promotes heat transfer to the fusible plug more than the container body, when the hydrogen cartridge 50 is affected by heat due to flames or the like, the combustible resin 84 burns and ignites, and the heat is transmitted to the fusible plug 57, so that the fusible plug 57 functions by being heated before the self-closing valve 56, allowing the intended gas to be discharged.

The type of combustible resin can be regarded as identical to that in the form 2C.

3.2.3. Form 4C

Figure 10:
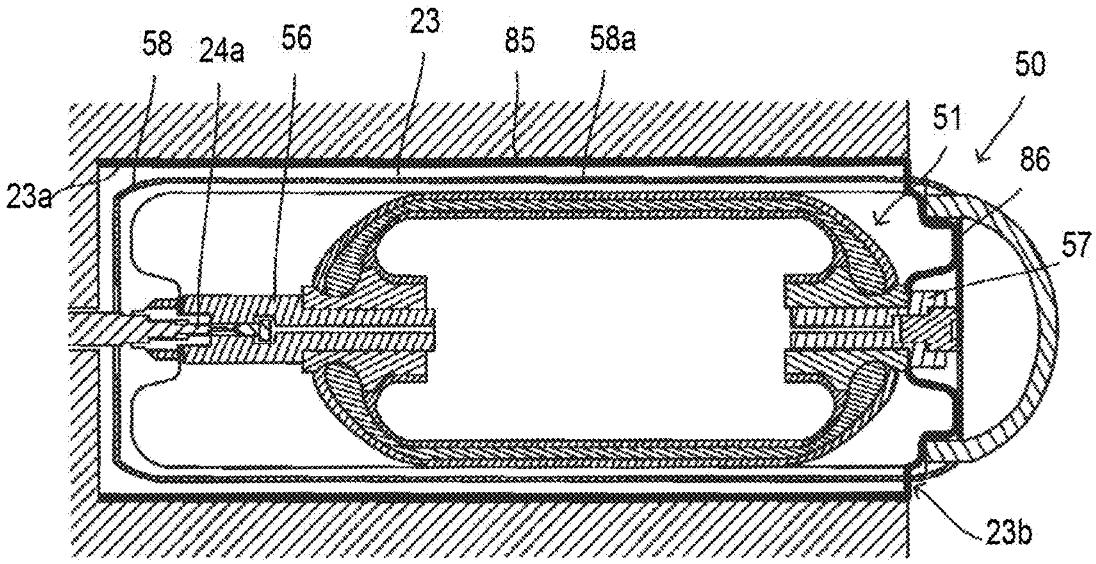
FIG. 10 is a diagram illustrating a form 4C.

FIG. 10 illustrates a diagram illustrating an aspect of a form 4C. FIG. 10 is a view from the same perspective as FIG. 3, with the hydrogen cartridge 50 attached to the accommodation portion 23.

In the form 4C, combustible resin 85 and a heat conductive material 86 are arranged. In this form, the combustible resin 85 covers a portion of the inner surface 23*a* of the accommodation portion 23 that faces the side surface of the housing 58*a* of the hydrogen cartridge 50, and the combustible resin 85 extends continuously therefrom so that the heat conductive material 86 is in contact with the fusible plug 57.

By arranging such a heat conductive material and combustible resin, which are members that promote heat transfer to the fusible plug more than the container body, when the hydrogen cartridge 50 is affected by heat due to flames or the like, the combustible resin 84 burns and ignites, and the heat is quickly transferred to the fusible plug 57 via the heat conductive material 86, so that the fusible plug 57 functions by being heated before the self-closing valve 56, allowing the intended gas to be discharged.

The type of heat conductive material can be regarded as identical to that in the form 2A, and the type of combustible resin can be regarded as identical to that in the form 2C.

4. Others

In the description, each of the aspects (forms 1A to 1D, forms 2A to 2D) of the hydrogen cartridge 50 and the aspects (forms 3A, 3B, forms 4A to 4C) of the accommodation portion 23 has been described. However, the aspects of the hydrogen cartridge 50 and the aspects of the accommodation portion 23 can be used together as long as there is no contradiction. Thereby, it is possible to make the effects of the present disclosure even more remarkable.

What is claimed is:

1. A hydrogen cartridge comprising:
a tank configured to store hydrogen, wherein
the tank includes,
a container body configured to store hydrogen gas,
a self-closing valve provided in the container body and configured to start and stop discharging the hydrogen gas by opening and closing,
a fusible plug provided in the container body and configured to open when a predetermined temperature is reached to release gas in the tank, and
at least one of a member that delays heat transfer to the self-closing valve later than to the container body or a member that promotes heat transfer to the fusible plug when the hydrogen cartridge is heated,
a case containing the tank, wherein
at least one part of the member that delays heat transfer to the self-closing valve is arranged in the case, and
at least one part of the member that promotes heat transfer to the fusible plug is arranged in the case.

2. The hydrogen cartridge according to claim 1, wherein the member that delays heat transfer to the self-closing valve is a heat insulating material provided around the self-closing valve, and the heat insulating material is not arranged around the fusible plug.

3. The hydrogen cartridge according to claim 1, wherein the member that delays heat transfer to the self-closing valve is a heat shielding material arranged with a gap from the self-closing valve, and the heat shielding material is not arranged around the fusible plug.

4. The hydrogen cartridge according to claim 1, wherein the member that promotes heat transfer to the fusible plug is a member with higher thermal conductivity than the container body, the member with higher thermal conductivity being partially arranged on an outer peripheral side of the tank and extends so as to be in contact with the fusible plug.

5. The hydrogen cartridge according to claim 1, wherein the member that promotes heat transfer to the fusible plug is a combustible resin member that is partially arranged on an outer peripheral side of the tank and extends so as to be in contact with the fusible plug.

6. A gas supply system comprising:
an accommodation portion that accommodates a hydrogen tank, wherein
the hydrogen tank includes,
a container body configured to store hydrogen gas,
a self-closing valve provided in the container body and configured to start and stop discharging the hydrogen gas by opening and closing, and
a fusible plug provided in the container body and configured to open when a predetermined temperature is reached to release gas in a tank, and
the accommodation portion includes at least one of a member that delays heat transfer to the self-closing valve later than to the container body or a member that promotes heat transfer to the fusible plug when a hydrogen cartridge is heated,
the case containing the tank, wherein
at least one part of the member that delays heat transfer to the self-closing valve is arranged in the case, and
at least one part of the member that promotes heat transfer to the fusible plug is arranged in the case.

7. The gas supply system according to claim 6, wherein the member that delays heat transfer to the self-closing valve is a heat insulating material provided in the accommodation portion at a position around the self-closing valve, and the heat insulating material is not arranged at a position around the fusible plug.

8. The gas supply system according to claim 6, wherein the member that delays heat transfer to the self-closing valve is a heat shielding material provided in the accommodation portion at the position around the self-closing valve, and the heat shielding material is not arranged at the position around the fusible plug.

9. The gas supply system according to claim 6, wherein the member that promotes heat transfer to the fusible plug is a member with higher thermal conductivity than the container body, the member with higher thermal conductivity being partially arranged in the accommodation portion and extends so as to be in contact with the fusible plug.

10. The gas supply system according to claim 6, wherein the member that promotes heat transfer to the fusible plug is a combustible resin member that is partially arranged in the accommodation portion and extends so as to be in contact with the fusible plug.

11. A hydrogen cartridge comprising:
a tank configured to store hydrogen, wherein
the tank includes,
a container body configured to store hydrogen gas,
a self-closing valve provided in the container body and configured to start and stop discharging the hydrogen gas by opening and closing,
a fusible plug provided in the container body and configured to open when a predetermined temperature is reached to release gas in the tank, and
at least one of a member that delays heat transfer to the self-closing valve later than to the container body or a member that promotes heat transfer to the fusible plug when the hydrogen cartridge is heated, and
the member that delays heat transfer covers an end surface or an outer periphery of the self-closing valve.

12. A gas supply system comprising:
an accommodation portion that accommodates a hydrogen tank, wherein
the hydrogen tank includes,
a container body configured to store hydrogen gas,
a self-closing valve provided in the container body and configured to start and stop discharging the hydrogen gas by opening and closing, and
a fusible plug provided in the container body and configured to open when a predetermined temperature is reached to release gas in a tank, and
the accommodation portion includes at least one of a member that delays heat transfer to the self-closing valve later than to the container body or a member that promotes heat transfer to the fusible plug when a hydrogen cartridge is heated, and
the member that delays heat transfer covers an end surface or an outer periphery of the self-closing valve.

* * * * *